United States Patent [19]

Sun

[11] Patent Number: 5,345,273
[45] Date of Patent: Sep. 6, 1994

[54] GHOST CANCELLER WITH VARIABLE DELAY SELECTOR

[75] Inventor: Cheng-Yun Sun, Taichung, Taiwan

[73] Assignee: Industrial Technology Research Institute, Taiwan

[21] Appl. No.: 33,774

[22] Filed: Mar. 19, 1993

[51] Int. Cl.$^5$ ............................................. H04N 5/21
[52] U.S. Cl. .................................. 348/607; 348/614
[58] Field of Search ................... 358/167, 166, 36, 37,
358/905; 364/724.16; 348/607, 608, 611, 614,
914; H04N 5/21, 5/213

[56] References Cited

U.S. PATENT DOCUMENTS

| | | |
|---|---|---|
| 4,947,252 | 8/1990 | Kobayashi et al. |
| 4,953,026 | 8/1990 | Kobayashi et al. |
| 5,222,035 | 6/1993 | Nakase et al. ................ 364/724.16 |
| 5,285,280 | 2/1994 | Teng et al. ........................ 348/614 |

FOREIGN PATENT DOCUMENTS

0090871  3/1990  Japan ................................. 358/905

*Primary Examiner*—James J. Groody
*Assistant Examiner*—Michael H. Lee
*Attorney, Agent, or Firm*—Meltzer, Lippe Goldstein, Wolf, Schlissel & Sazer

[57] ABSTRACT

A system is disclosed for cancelling ghosts including I daisy chained variable delay elements, the first of which receives a video signal. J multiplexers are also provided, each of which has at least one input connected to the output of each of the I variable delay elements. A transversal filter element is connected to the output of each multiplexer for filtering the delayed video signals selected by the corresponding multiplexer connected thereto. Finally, an adder is provided for adding together the filtered video signals outputted by the transversal filter elements.

13 Claims, 9 Drawing Sheets

GHOST CANCELLER WITH VARIABLE DELAY SELECTOR

RELATED CASE

Application Ser. No. 08/033,400, now U.S. Pat. No. 5,285,280, entitled "Division Method and System for Ghost Cancellation" has been filed on an even date herewith and is assigned to the assignee of the present application. The above application contains subject matter related to the subject matter of the present application and is incorporated herein by reference.

FIELD OF THE INVENTION

The present invention relates to filtering video signals. More particularly, the present invention relates to cancelling ghosts, or extraneous duplicate signals, from a video signal transmitted via a multipath channel.

BACKGROUND OF THE INVENTION

Figure 1A:
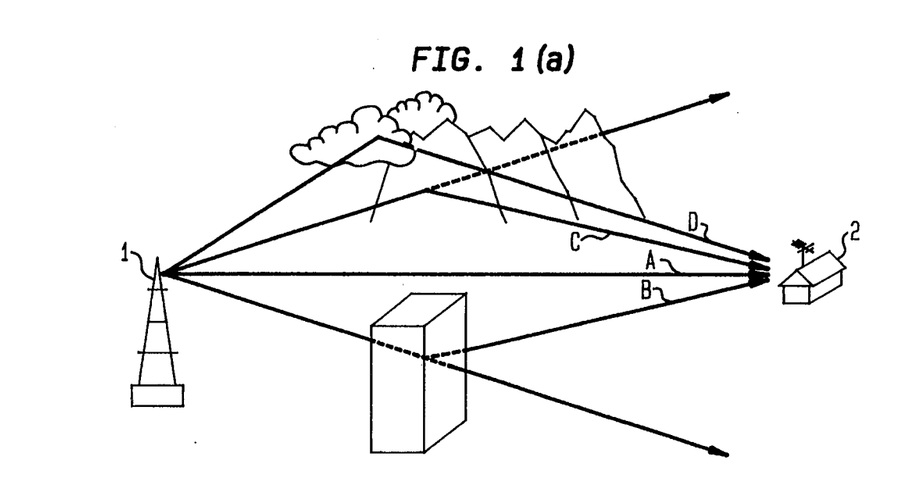
FIGS. 1(a),(b) illustrate a multipath channel and a post-ghost formed by that channel, respectively.
Figure 1B:
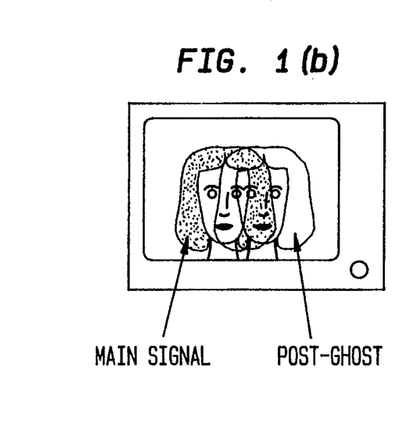

FIG. 1(a) depicts a multipath channel through which television signals propagate from a transmitter 1 to a receiver 2. As depicted, the television signals arrive at the receiver 2 via a number of paths A, B, C, D including a short direct path A, and longer paths B, C, D in which the signals reflect off of features of the channel (e.g., buildings, mountains, and the ionosphere). All of these signals are superimposed at the receiver 2. The signals arriving via the paths B–D are weaker than the signal arriving via the direct path A. Thus, the signal arriving via the path A produces the strongest video image at the receiver 2 and is referred to as the "main" signal. Furthermore, the signals arriving via the paths B–D are delayed with respect to the main signal arriving via the path A. As a result, the signals arriving via the paths B–D produce delayed duplicate video images or "post-ghosts" of the main signal arriving via the path A as depicted in FIG 1(b).

Figure 1C:
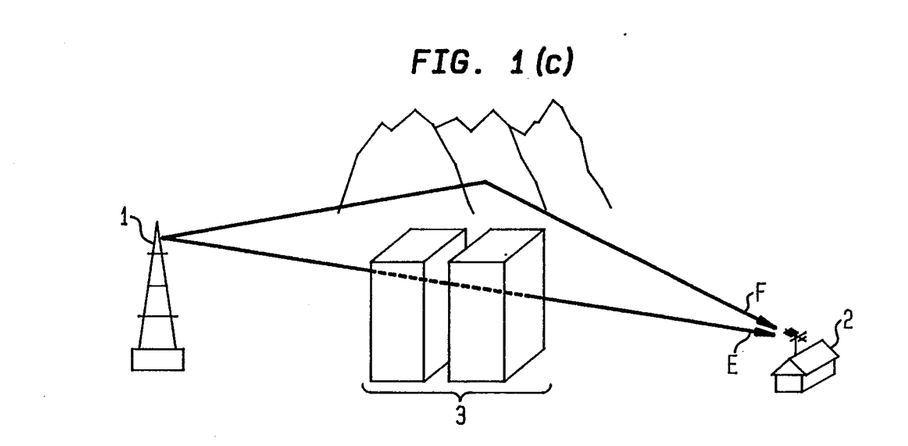
Figure 1D:
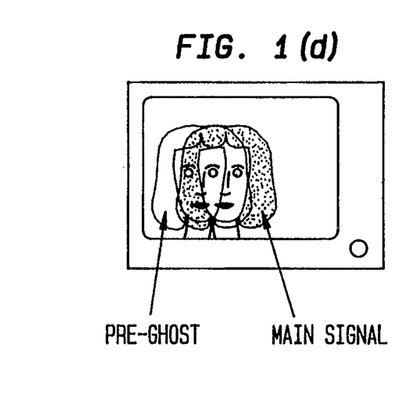

Another multipath channel is depicted in FIG 1(c). As depicted, a signal arrives via a short path E through buildings 3. A signal also arrives via a longer reflection path F and is thus delayed with respect to the signal arriving via the short path E. In this case, it is assumed that the signal arriving via path E is attenuated to a greater extent (by virtue of propagating through the buildings 3) than the signal arriving via the path F. In such a case, the weaker signal arriving via the path E produces a "pre-ghost" of the main signal arriving via the path F as depicted in FIG 1(d).

Figure 2A:
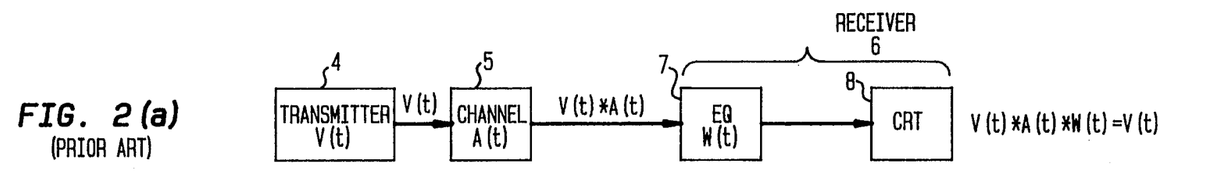
FIG. 2(a) illustrates a video signal transmission path.

It is desirable to eliminate both pre-ghosts and post-ghosts of the main signal in order to improve reception. Several ghost cancelling systems have been proposed in the form of a channel equalizer. FIG. 2(a) depicts a transmission path including a transmitter 4, a multipath channel 5 and a receiver 6 which includes a channel equalizer 7 and a display device 8. In such systems, an ideal ghost cancelling reference (GCR) signal $R_{ideal}(t)$ is inserted into the video signal V(t), e.g., during the vertical blanking interval, prior to transmission from the transmitter 4. The transmitter 4 transmits the video signal V(t) (including the ideal GCR signal $R_{ideal}(t)$) which propagates through the multipath channel 5 having an impulse response A(t). By virtue of propagating through the multipath channel 5, a signal with ghosts V(t)*A(t) (including $R_{ideal}(t)$*A(t)) is produced, where "*" means "convolved with". This signal V(t)*A(t) is received at the receiver 6 where it is inputted to the channel equalizer 7. The channel equalizer 7 has an impulse response W(t) and therefore outputs the signal V(t)*A(t)*W(t). The channel equalizer 7 is designed so that V(t)*A(t)*W(t)=V(t). The signal outputted from the channel equalizer 7 is then displayed on a display device such as a cathode ray tube (CRT) screen 8.

Figure 2B:
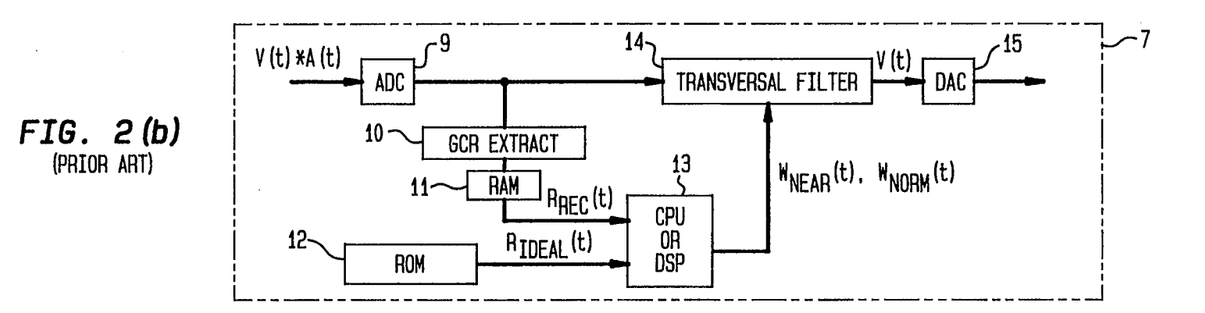
FIGS. 2(b),(c) illustrate a prior art ghost cancelling channel equalizer.

The channel equalizer 7 is shown in greater detail in FIG. 2(b). As depicted in FIG. 2(b), the channel equalizer 7 typically includes an analog to digital converter (ADC) 9 which converts the received video signal V(t)*A(t) to digital form. Illustratively, the received video signal V(t)*A(t) has an upper cutoff frequency of approximately 4.2 MHz. The received video signal V(t)*A(t) is illustratively sampled in the ADC 9 at 14.32 MHz. These samples are inputted to an extraction circuit 10 which extracts the received GCR signal $R_{rec}(t)$ (where $R_{rec}(t)=R_{ideal}(t)*A(t)$) from the received video signal V(t)*A(t). This received GCR signal $R_{rec}(t)$ may be temporarily stored in a RAM 11. The received GCR signal $R_{rec}(t)$ is then compared to an ideal GCR signal $R_{ideal}(t)$ (obtained from a circuit 12, such as a ROM) in a CPU or digital signal processor (DSP) 13. Based on the discrepancy between the received $R_{rec}(t)$ and the ideal $R_{ideal}(t)$ GCR signals, the CPU or DSP 13 generates filtering or tap coefficients for cancelling ghosts in the received video signal V(t)*A(t). The tap coefficients are transferred to a transversal filter 14. The received video signal V(t)*A(t) is accordingly digitally filtered by the transversal filter 14 using the tap coefficients determined by the CPU or DSP 13. The filtered video signal outputted by the transversal filter 14 may illustratively be converted back to analog form in a digital to analog converter (DAC) 15.

Figure 2C:
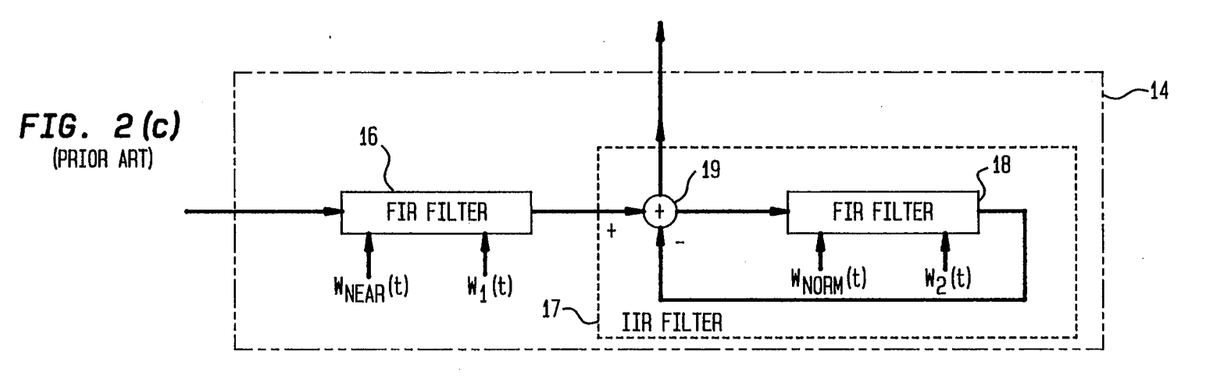

FIG. 2(c) shows an exemplary prior art transversal filter 14 including a finite impulse response filter (FIR) 16, and an infinite impulse response filter (IIR) 17. Illustratively, the IIR filter 17 is formed by connecting a second FIR filter 18 in negative a feedback path of an adder 19 to which the FIR filter 16 is connected.

Several conventional algorithms have been proposed for obtaining FIR and IIR tap coefficients (see U.S. Pat. No. 4,947,252). Tap coefficients of the transversal filter 14 (FIG. 2(c)) within the channel equalizer 7 (FIG. 2(a)) may be derived from the formula V(t)*A(t)*W(t)=V(t). According to one conventional method, called a division method, the tap coefficients are determined so that $$W(f) = \frac{V(f)}{V(f) \cdot A(f)} \quad (1)$$

where V(f), A(f) and W(f) are the video signal, the channel impulse response and the equalizer impulse response, in the frequency domain, respectively. The video signal V(f) and the channel impulse response A(f) are both unknown and vary over time. If, however, a known ghost cancelling reference (GCR) signal $R_{ideal}(t)$ is inserted into the video signal V(t) prior to transmission, then the tap coefficients may be generated by comparing the received and ideal GCR signals $R_{rec}(t)$ and $R_{ideal}(t)$. In such a case, the above formula may be simplified to:

$$W(f) = \frac{R_{ideal}(f)}{R_{ideal}(f) \cdot A(f)} \quad (2)$$

Figure 3:
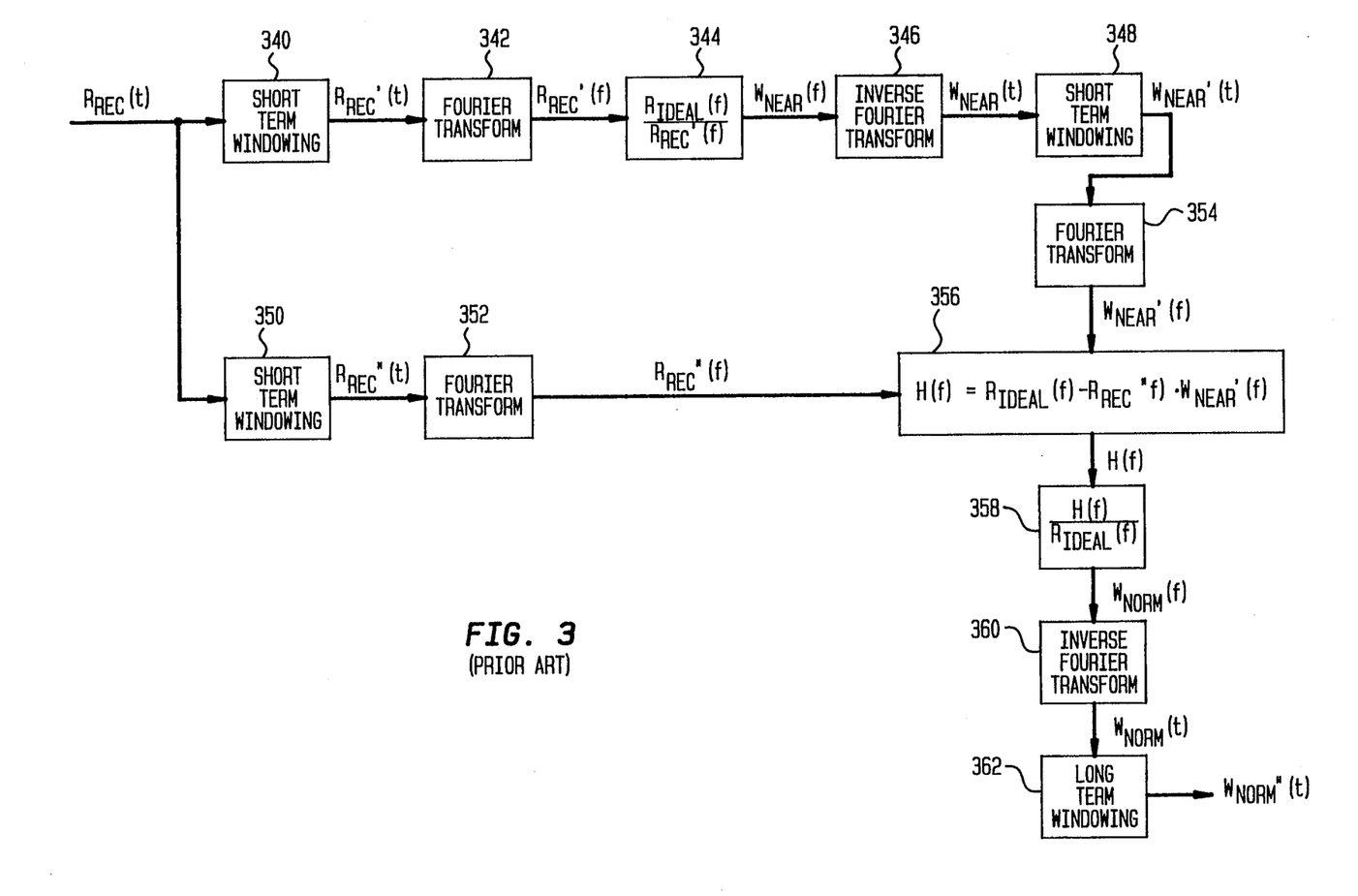
FIG. 3 schematically depicts a prior art division method algorithm.

FIG. 3 depicts one conventional division method algorithm for obtaining tap coefficients. Typically, the FIR filter 16 utilizes a relatively small number of taps for cancelling "nearby" ghosts (e.g., a ghost separated by 2 μsec from the main signal). To determine nearby ghost tap coefficients according to this method, the signal $R_{rec}(t)$ is first windowed over a short interval appropriate for cancelling nearby ghosts to produce the signal $R_{rec}'(t)$ in step 340 (herein, one prime mark indicates short term windowing). Next, in step 342, the signal $R_{rec}'(t)$ is fourier transformed to produce the signal $R_{rec}'(f)$. Then, in step 344, the nearby ghost tap coefficient signal $W_{near}(f)$ is determined by the formula $$W_{near}(f) = \frac{R_{ideal}(f)}{R_{rec}'(f)} \quad (3)$$

In step 346, this signal $W_{near}(f)$ is converted to the time domain by computing its inverse fourier transform. Finally, in step 348, the signal $W_{near}(t)$ is windowed over a short interval (appropriate for producing nearby ghost tap coefficients) to produce the signal $W_{near}'(t)$.

The prior art division method of FIG. 3 also produces tap coefficients for the IIR filter 17. The IIR filter 17 typically has a large number of tap coefficients for cancelling "non-nearby" or "normal" ghosts (e.g., a ghost separated by 40 μsec from the main signal).

In step 350, the received GCR signal $R_{rec}(t)$ is windowed appropriately for cancelling normal ghosts to produce the signal $R_{rec}''(t)$ (herein, two prime marks means long term windowing). Next, in step 352, the signal $R_{rec}''(t)$ is fourier transformed to produce the signal $R_{rec}''(f)$. In step 354, the windowed nearby tap coefficient signal $W_{near}'(t)$ (obtained in step 348) is fourier transformed to produce the signal $W_{near}'(f)$. These two signals $R_{rec}''(f)$ and $W_{near}'(f)$ are used to form the signal $h(f)$ in step 356. $h(f)$ is determined by the formula:

$$h(f) = R_{ideal}(f) - R_{rec}''(f) \cdot W_{near}'(f) \quad (4)$$

Then in step 358, the normal ghost tap coefficient signal $W_{norm}(f)$ is determined by the formula:

$$W_{norm}(f) = \frac{h(f)}{R_{ideal}(f)} \quad (5)$$

In step 360, the inverse fourier transform of $W_{norm}(f)$ is computed to produce the signal $W_{norm}(t)$. Finally, $W_{norm}(t)$ is windowed over a long interval (appropriate for producing normal ghost tap coefficients) to produce the signal $W_{norm}''(t)$ in step 362.

Figure 4:
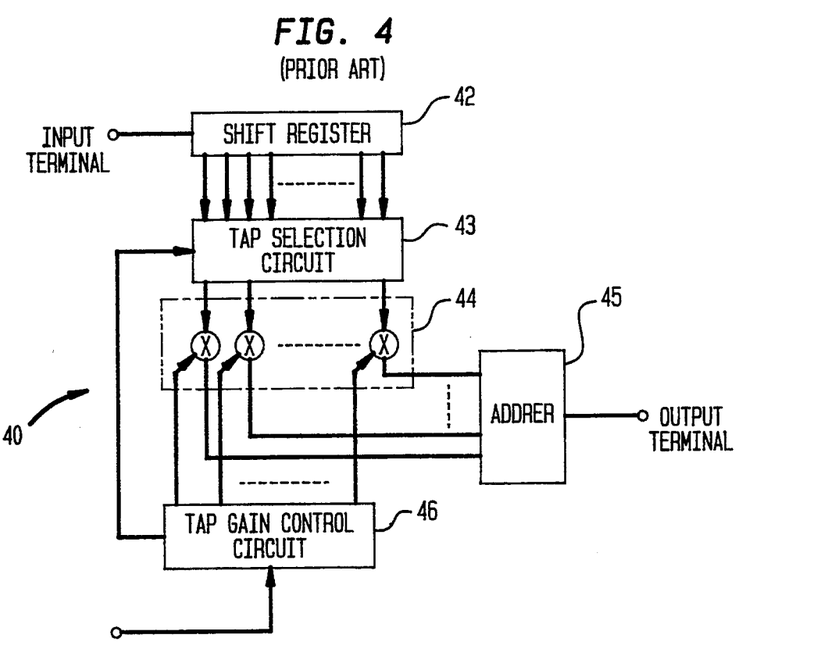
FIG. 4 illustrates a first prior art circuit for implementing the transversal filter depicted in FIG. 2(c).

Several different circuits have been proposed for implementing the FIR or IIR filters 16 or 17 (see U.S. Pat. No. 4,953,026). FIG. 4 shows a first prior art circuit 40, suitable for implementing a FIR filter 16, called a one-tap selection circuit. Digital samples of a received video signal which are inputted to the FIR filter 40 are shifted into a shift register 42. These digital samples are read out of the shift register 42 by a tap selection circuit 43. In addition, a plurality of tap coefficients (determined, for example, according to the aforementioned division method) are inputted to a tap gain controller circuit 46. The tap gain controller circuit 46 outputs the largest tap coefficient from the tap coefficients inputted thereto to a plurality of multipliers 44. The tap gain control circuit also causes the tap selection circuit 43 to supply selected video samples from the shift register 42 to particular multipliers 44. Each supplied video sample is multiplied in the multipliers 44 by the largest tap coefficient (which tap coefficient is supplied by the tap gain controller circuit 46). These products are then added together in an adder 45.

Figure 5:
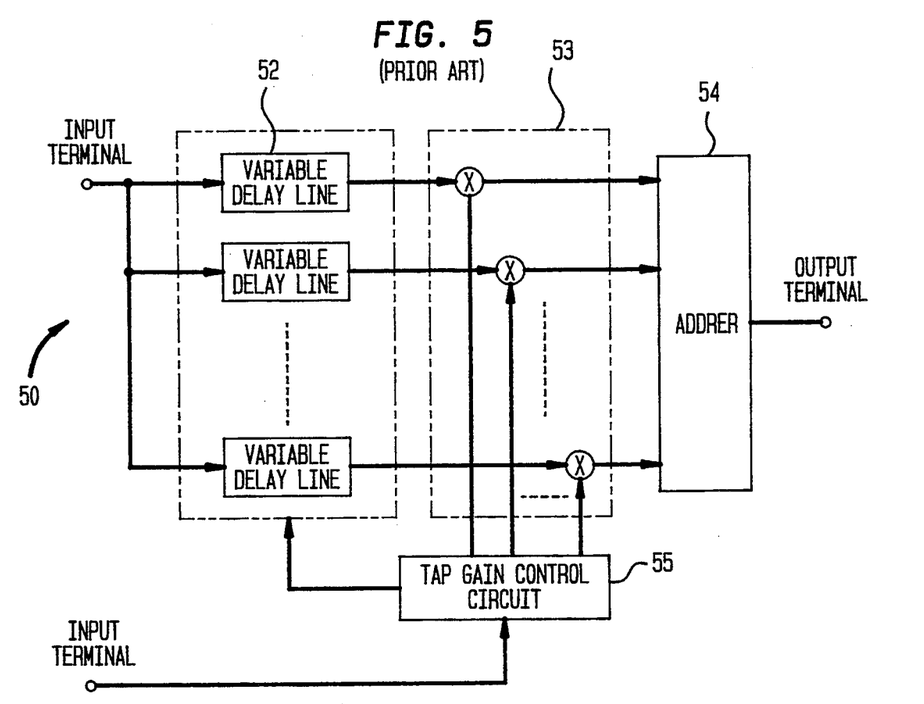
FIGS. 5 illustrates a second prior art circuit for implementing the transversal filter depicted in FIG. 2(c).

FIG. 5 shows a second prior art circuit 50, suitable for implementing a FIR filter, called a one-tap variable delay circuit. In this circuit 50, the video samples are inputted, in parallel, to a plurality of variable delay elements 52. A tap gain control circuit 55 controls the delay period of each variable delay element 52 and also outputs a single tap coefficient to each of the multipliers 53. The video samples are outputted from each variable delay element 52 to the multipliers 53 where they are multiplied by the tap coefficient supplied by the tap gain control circuit 55. The products outputted by the multipliers 53 are then added together in an adder circuit 54.

Figure 6:
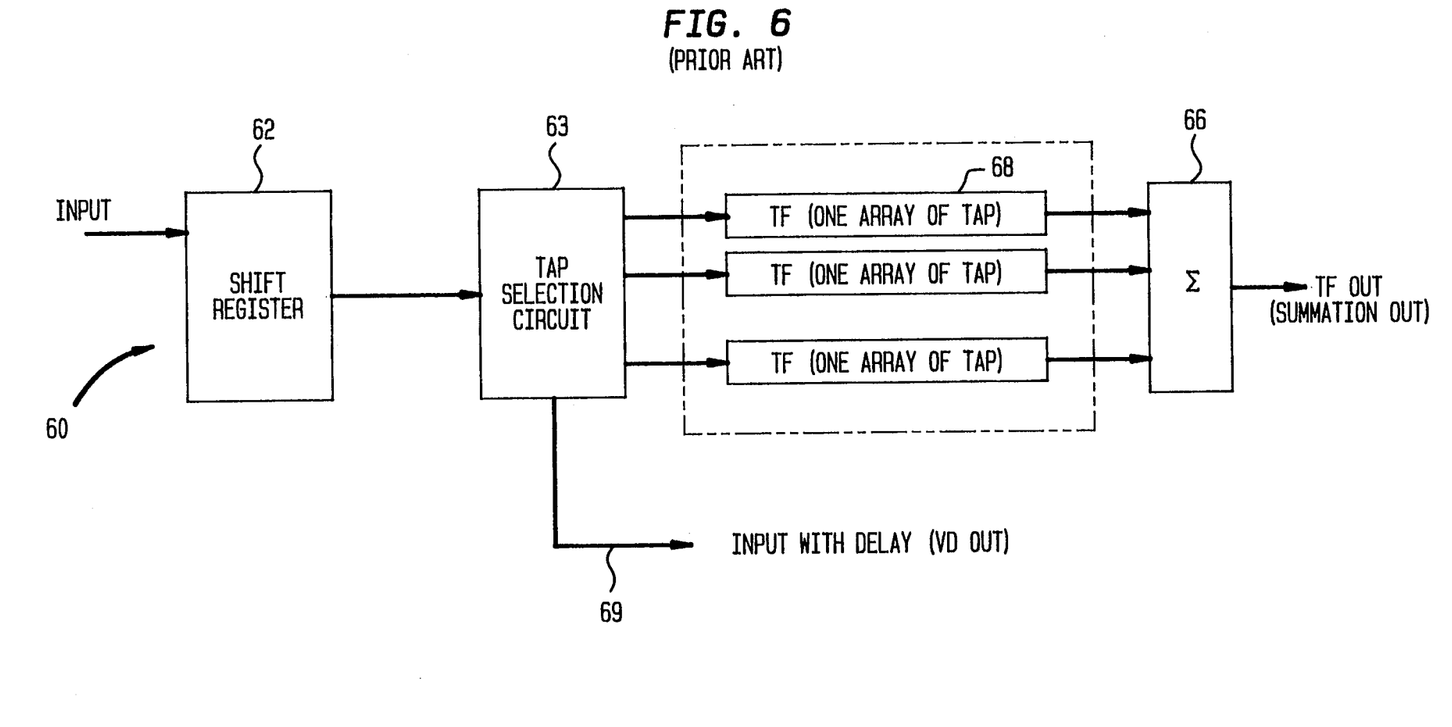
FIG. 6 illustrates a third prior art circuit for implementing the transversal filter depicted in FIG. 2(c).
Figure 6A:
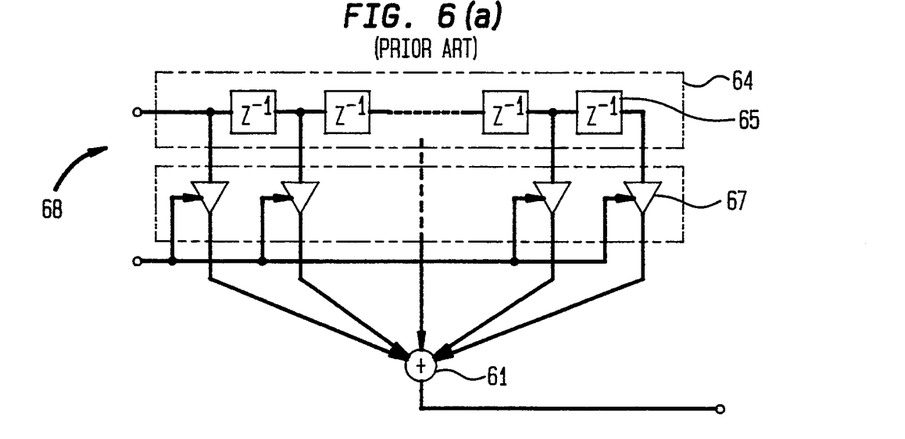
FIG. 6(a) illustrates a transversal filter element for use in the circuit of FIG. 6.

A third prior art circuit 60, called a multi-tap selection circuit, is shown in FIG. 6. Video samples are shifted into a shift register 62. A highly complex tap selection circuit 63 is provided for selecting groups of video samples in the shift register 62 for output to transversal filters elements 68. A prior art transversal filter element 68 is shown in greater detail in FIG. 6(a). Video samples are received in a shift register 64 comprising a plurality of one sample delays 65. The video samples are supplied from each one of the sample delays 65 of the shift register 64 to corresponding multipliers 67. Each of the multipliers 67 also receives a tap coefficient of an array of tap coefficients and multiplies the video samples inputted thereto by this tap coefficient of the array. The products outputted by the multipliers 67 are added together in an adder 61. The outputs of the transversal filter elements 68 (FIG. 6), in turn, are added together in an adder circuit 66 (FIG. 6). As depicted in FIG. 6, the circuit 60 also has an output 69 for shifting out video samples which propagate through the shift register 62. This output 69 may be connected to the shift register of another similar circuit 60 connected sequentially to the first circuit 60.

Figure 7A:
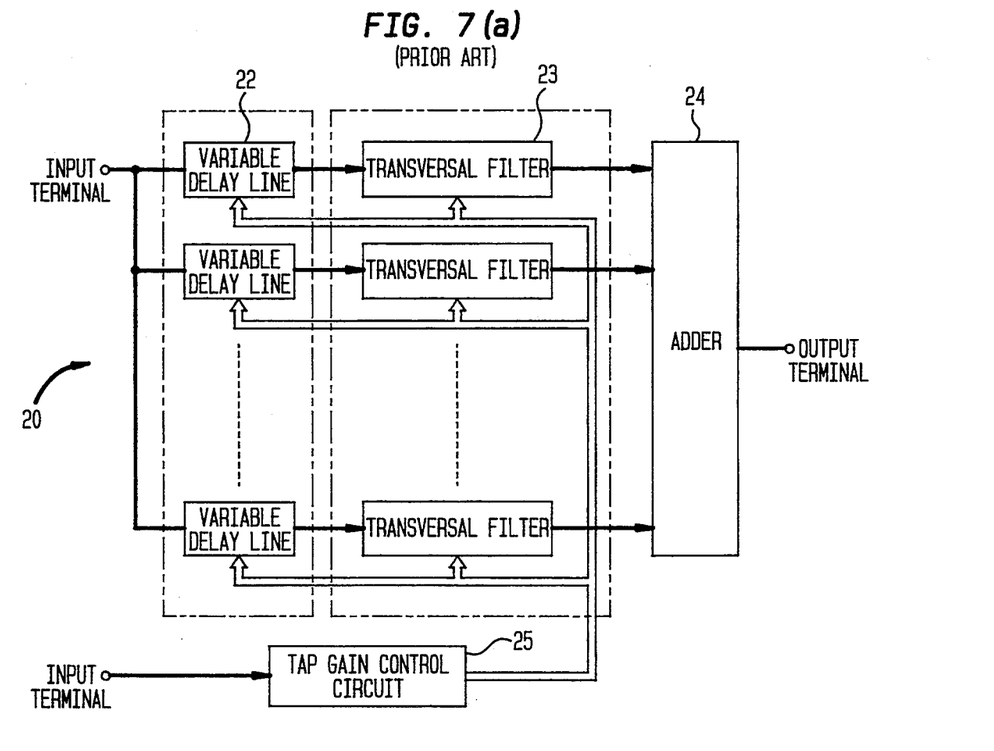
FIGS. 7(a)–(b) illustrates a fourth prior art circuit for implementing the transversal filter depicted in FIG. 2(c).

Finally, U.S. Pat. No. 4,953,026 discloses a fourth prior art circuit 20 or 28 (FIGS. 7(a)–(b)), called a multi-tap variable delay circuit. In FIG. 7(a), video samples are received, in parallel, into a plurality of variable delay elements 22. The delay period of the variable delay elements 22 is controlled by a tap gain control circuit 25. Each variable delay element 22 outputs the video samples received therein to a corresponding transversal filter element 23 where the video samples are multiplied by an array of tap coefficients. As with the prior art circuits 40 (FIG. 4) and 50 (FIG. 5), the tap coefficients are supplied by the tap gain control circuit 25. The outputs of the transversal filter elements are then added together in an adder 24.

Figure 7B:
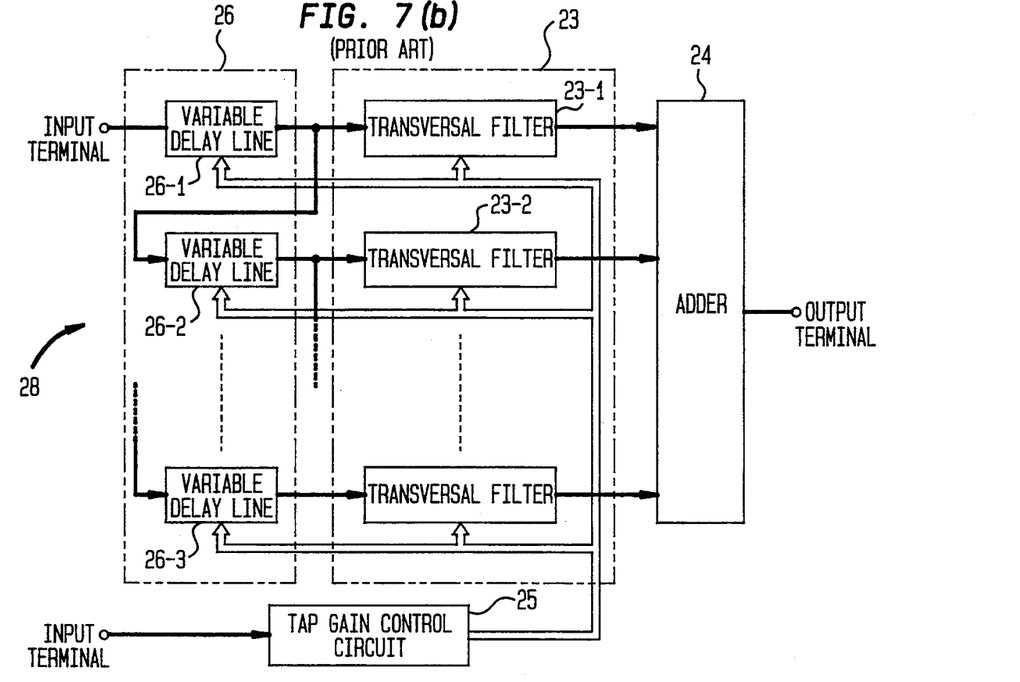

FIG. 7(b) shows an alternative embodiment of the multi-tap variable delay circuit 28 in which the variable delay elements 26 are daisy chained, i.e., sequentially connected in tandem. Video samples are inputted to the first variable delay element 26-1 and propagate therethrough. The video samples are then outputted to the second variable delay element 26-2 and from the second variable delay element 26-2 to the third variable delay element 26-3, etc. The circuit 28 is otherwise similar to the circuit 20 (FIG. 7(a)).

Each of these prior art circuits has disadvantages. The one tap selection circuit 40 (FIG. 4) requires a tap selection circuit 43 (FIG. 4) which is extremely complex and requires a large number of components. Both the complexity and number of components increase when such circuits 40 (FIG. 4) are used to form non-nearby ghost cancelling IIR filters which typically require many tap coefficients. Thus, such a circuit 40 (FIG. 4) is both difficult to produce within an integrated circuit chip and very expensive to manufacture. The one tap variable delay circuit 50 (FIG. 5) does not use complex selector circuits. However, the number of variable delay elements 52 (FIG. 5) necessary for ghost cancelling, particularly, non-nearby ghost cancelling in IIR filters, is large. Thus, this circuit 50 (FIG. 5) is also both expensive to manufacture and difficult to produce within an integrated circuit chip.

Figure 8:
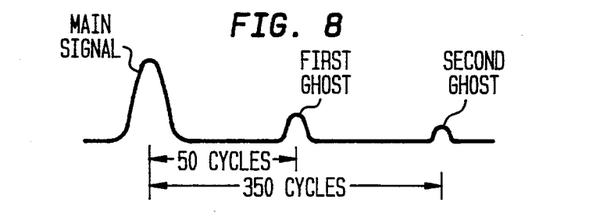
FIG. 8 graphically illustrates a main signal and two ghosts.

The multi-tap selection circuit 60 (FIG. 6) and multi-tap variable delay circuit 20 or 28 (FIGS. 7(a)-(b)) are better suited for IIR filters. However, as with the one tap selection circuit 40 (FIG. 4), the multi-tap selection circuit 60 (FIG. 6) requires an overly complex tap selection circuit 63 (FIG. 6) which is expensive and difficult to implement on an integrated circuit chip. The multi-tap variable delay circuit 20 or 28 (FIGS. 7(a)-(b)) does not require an overly large selection circuit or variable delay circuit. This circuit 20 or 28 (FIGS. 7 (a)-(b)), however, is disadvantageous in practice because transversal filter elements 23 (FIGS. 7(b)) are wasted. This may be better appreciated by an example. Suppose the maximum delay period of each variable delay element 22 of FIG. 7(a) and of FIG. 7(b) is two hundred clock cycles. Furthermore, suppose it is desirable to cancel a first ghost which is delayed from the main video signal by fifty clock cycles and a second ghost which is delayed from the main video signal by three hundred fifty clock cycles. FIG. 8 is a graph showing the relationship of the ghosts and the main video signal.

Using the circuit 28 of FIG. 7(b), the first variable delay element 26-1 may be adjusted to a delay of approximately fifty clock cycles, the second variable delay element 26-2 may be adjusted to a delay of two hundred clock cycles and the third variable delay element 26-2 may be adjusted to a delay of approximately one hundred clock cycles. (The circuit 20 of FIG. 7(a) cannot cancel the second ghost because it cannot delay the video signal by three hundred fifty clock cycles). The first transversal filter element 23-1 is then used to cancel the first ghost and the third transversal filter element 23-3 is then used to cancel the second ghost. It may be appreciated, however, that the second transversal filter element 23-2 cannot be used at all and is thus wasted.

It is therefore an object of the present invention to provide a ghost cancelling circuit which overcomes the disadvantages of the prior art circuits.

SUMMARY OF THE INVENTION

This and other objects are achieved by the present invention which provides a ghost cancelling circuit including I daisy chained variable delay elements, where I is an integer $\geq 1$. The first variable delay element receives an inputted video signal. J multiplexers are also provided, where J is an integer $\geq 1$ but not necessarily equal to I. Each of the J multiplexers has at least one input connected to each of the I variable delay elements. The output of each of the J multiplexers is connected to a corresponding transversal filter element. Thus, there are also J transversal filter elements. The signals outputted from each of the transversal filter elements are added together in an adder.

In operation, one or more variable delay elements may be adjusted to delay a video signal for a period approximately equal to the period separating a ghost signal from the main video signal to be recovered. In practice, more than one tandem variable delay element may be needed to delay the signal an amount of time necessary to cancel a single ghost. Each multiplexer, however, can select the output of any variable delay element. It may be appreciated from the following example that this permits providing fewer transversal filter elements than variable delay elements so as to conserve transversal filter elements.

Suppose the maximum delay to which each variable delay element may be adjusted is two hundred clock cycles. Furthermore, suppose it is desired to cancel a first ghost delayed by fifty clock cycles from the main signal and a second ghost delayed by three hundred fifty clock cycles from the main signal. In such a case, a first variable delay element is adjusted to an approximately fifty clock cycle delay, a second variable delay element, connected thereto, to a two hundred clock cycle delay and a third variable delay element, connected to the second variable delay element, to an approximately one hundred clock cycle delay. One multiplexer is used to select the output of the first variable delay element for input to the transversal filter to which the multiplexer is connected. A second multiplexer is used to select the output of the third variable delay element for input to the transversal filter to which the second multiplexer is connected. Thus only two transversal filters are required to cancel the two ghost images. In contrast, the prior art arrangement of FIG. 7(a) may not be able to cancel these ghosts at all and the arrangement of FIG. 7(b) requires three transversal filters.

Since it does not matter which multiplexers are used to select the outputs of the variable delay elements, any other multiplexers (and corresponding transversal filter elements connected thereto) which may have been provided are conserved and may be used for cancelling other ghosts. Thus, the number of transversal filter elements may be chosen independently of the number of variable delay elements. More importantly, fewer transversal filter elements than variable delay elements may be provided thereby reducing costs and space requirements.

In short, a circuit is provided for implementing a transversal filter in a ghost canceller which is simple and which uses relatively few components. The circuit is thus reasonably inexpensive and relatively easy to produce within an integrated circuit chip. Additionally, the circuit has increased flexibility so as to support increased capacity and precision with few or no hardware modifications.

BRIEF DESCRIPTION OF THE DRAWINGS

FIGS. (c),(d) illustrate a second multipath channel and a pre-ghost formed by that channel, respectively.

DETAILED DESCRIPTION OF THE INVENTION

Figure 9:
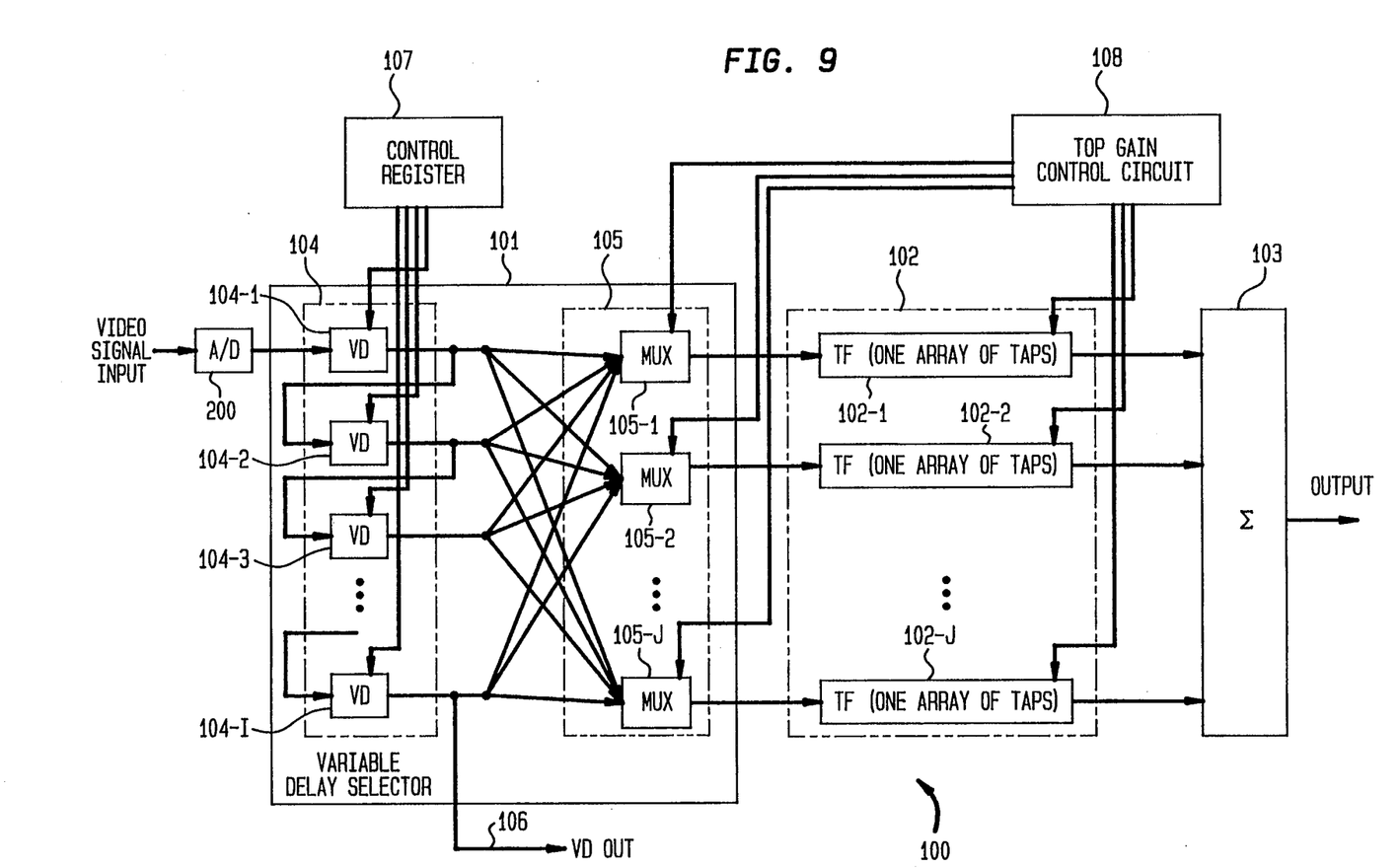
FIG. 9 depicts one embodiment of the present invention.

Referring now to FIG. 9, an embodiment of a ghost cancelling circuit according to the present invention, is depicted. Such a circuit may be used to implement a FIR 16 or a FIR filter 18 of the IIR filter 17 (FIG. 2(c)) in a transversal filter 7 of a channel equalizer (FIG. 2(c)). The circuit includes a variable delay selector 101 connected to a plurality of transversal filter elements 102-1, 102-2, ..., 102-J (hereinafter, collectively referred to as 102). The transversal filter elements 102 are, in turn, connected to a J-input adder circuit 103. The transversal filter elements 102 illustratively are similar to the transversal filter elements 68 of FIG. 6(a).

As depicted in FIG. 9, the variable delay selector 101 has I variable delay elements 104-1, 104-2, 104-3, ..., 104-I (hereinafter collectively referred to by 104) and J multiplexers 105-1, 105-2, ..., 105-J (hereinafter collectively referred to by 105) where I and J are any integers $\geq 1$ but not necessarily equal to one another. Illustratively, the variable delay elements are similar to the variable delay elements 26 of FIG. 7(b). Each variable delay element 104 is illustratively connected to a control register 107. The control register 107 receives variable delay periods $T_1, T_2, \ldots, T_I$ corresponding to particular variable delay elements 104-1, 104-2, ..., 104-I, respectively. Illustratively, these delay periods are determined by the CPU or DSP 13 (FIG. 2(b)) and are stored in the control register 107 for output to the variable delay elements 104. In this manner, the delay period of each variable delay element 104 may be independently adjusted. The control register 107 may be a separate register connected to the CPU or DSP 13 (FIG. 2(b)) or merely be one of the registers contained therein. An analog to digital converter 200 may be provided at the input of the first variable delay element 104-1 for converting the video signal to a digital signal.

The variable delay elements 104 are daisy chained, i.e., sequentially connected in tandem. As such, a video signal outputted from an $i^{th}$ variable delay element (where $1 \leq i \leq I$) is delayed by the sum of the delay periods $T_i + T_{i-1} + T_{i-2} + \ldots + T_2 + T_1$ of that particular variable delay element 104-i and the variable delay elements 104-i-1, 104-i-2, ..., 104-2, 104-1 which precede it.

The output of each variable delay element 104 is inputted to each multiplexer 105-1, 105-2, ..., 105-J. Thus, each multiplexer can select a video signal outputted from any variable delay element 104. Furthermore, more than one multiplexer, e.g., 105-1 and 105-J, can select the video signal outputted by the same variable delay element, e.g., 104-3. As will be described in greater detail below, this permits increasing the precision of the tap coefficients without changing the transversal filter elements 102.

The output of each multiplexer 105 is fed to a corresponding transversal filter element 102. Thus, there are equal numbers of multiplexers 105 and transversal filter elements 102. By virtue of interposing the multiplexers 105 between the variable delay elements 104 and the transversal filter elements 102, each transversal filter element 102 may receive the delayed video signal outputted by any variable delay element 104.

Illustratively, both the transversal filter elements 102 and the multiplexers 105 are connected to a tap gain control circuit 108. The tap gain control circuit 108 receives arrays of tap coefficients from the CPU or DSP 13 (FIG. 2(b)) and outputs each array of tap coefficients to a different transversal filter element 102. Additionally, the tap gain control circuit 108 causes the multiplexers 105 connected to the transversal filter elements 102 to select the video signal outputted from one of the variable delay elements 104. The tap gain control circuit 108, is designed to control the multiplexers 105 so that the particular transversal filter element receiving an array of tap coefficients suitable for cancelling a particular ghost also receives the video signal that is delayed by a period approximately equal to the interval separating that ghost from the main signal.

The operation of the invention is now illustrated by an example. Suppose it is desired to cancel a first ghost which is separated from the main video signal by fifty clock cycles and a second ghost which is separated from the main video signal by three hundred fifty clock cycles. Such signals are depicted in FIG. 8. Further, suppose that the maximum delay period which may be adjusted in each variable delay element 104 is two hundred clock cycles. In this case, a delay period of approximately fifty clock cycles is adjusted in the first variable delay element 104-1, a period of approximately two hundred clock cycles is adjusted in the second variable delay element 104-2 and a period of approximately one hundred clock cycles is adjusted in the third variable delay element 104-3. One multiplexer, e.g., the multiplexer 105-1, selects the output of the first variable delay element 104-1. A second multiplexer, e.g., the multiplexer 105-2, selects the output of the third variable delay element 104-3. The video signal delayed by approximately fifty clock cycles is fed to the transversal filter element 102-1 where it is multiplied by an array of tap coefficients appropriate for cancelling the first ghost. The video signal delayed by approximately three hundred fifty clock cycles is thus fed to the transversal filter element 102-2 where it is multiplied by an array of tap coefficients appropriate for cancelling the second ghost. The outputs of these two filters are fed to the adder 103 where they are added together to produce a video signal with cancelled ghosts.

It may be appreciated from this example, that the number of transversal filter elements 102 necessary to cancel one or more ghosts may be chosen independently from the number of variable delay elements 104 necessary to delay the video signal. Furthermore, any of the transversal filter elements 102 may be used to cancel a particular ghost. Thus, transversal filter elements 102 are conserved.

In practice, it is usually desirable to delay the video signals inputted to the transversal filter elements 105 slightly less than the separation of each ghost from the main signal. This is because the video signals are subjected to further delays by other components of the ghost canceller circuit 100.

It may also be appreciated that a pre-ghost may be cancelled by delaying the main signal with respect to the pre-ghost. In an analogous fashion to cancelling post-ghosts, the non-delayed signal is scaled by an array of tap coefficients and added to the delayed main signal (or other video signals) in order to cancel the pre-ghost.

The variable delay selector may also be provided with a variable delay output 106 connected to the output of the last variable delay element 104-I. This allows for the connection of the variable delay output 106 to the video signal input (and thereby, the first variable delay element) of a second variable delay selector.

The circuit 100 may also filter video signals using higher precision tap coefficients than those for which the transversal filter elements 102 are designed. For instance, assume that the transversal filter elements 102 are designed to filter a video signal with an array of eight-bit tap coefficients. In order to filter the signal with an array of nine-bit tap coefficients, an array of nine-bit coefficients may be divided into a number of lower precision arrays, e.g., two arrays of eight-bit tap coefficients, which eight-bit arrays may be added together to produce the nine-bit array. Each eight-bit array is supplied to a different transversal filter element, e.g., the transversal filter elements 102-1 and 102-2, respectively. Each of the transversal filter elements 102-1 and 102-2 then simultaneously receives the same video signal delayed by the same amount. This may be easily achieved by selecting the output of the same variable delay element, e.g., the variable delay element 104-3, using the respective multiplexer 105-1 and 105-2 connected to each of the transversal filter elements 102-1 and 102-2. The signals outputted by the transversal filter elements 102-1 and 102-2 are then added in the adder 103 to produce a video signal filtered by the nine-bit array of tap coefficients. This result occurs because transversal filtering is a linear operation and a linear operation performed on a sum of arguments equals the sum of the linear operation performed on each argument separately. It may also be appreciated that a high precision array may be divided into more than two lower precision sub-arrays, e.g., a ten-bit array may be divided into four eight-bit arrays.

Figure 10:
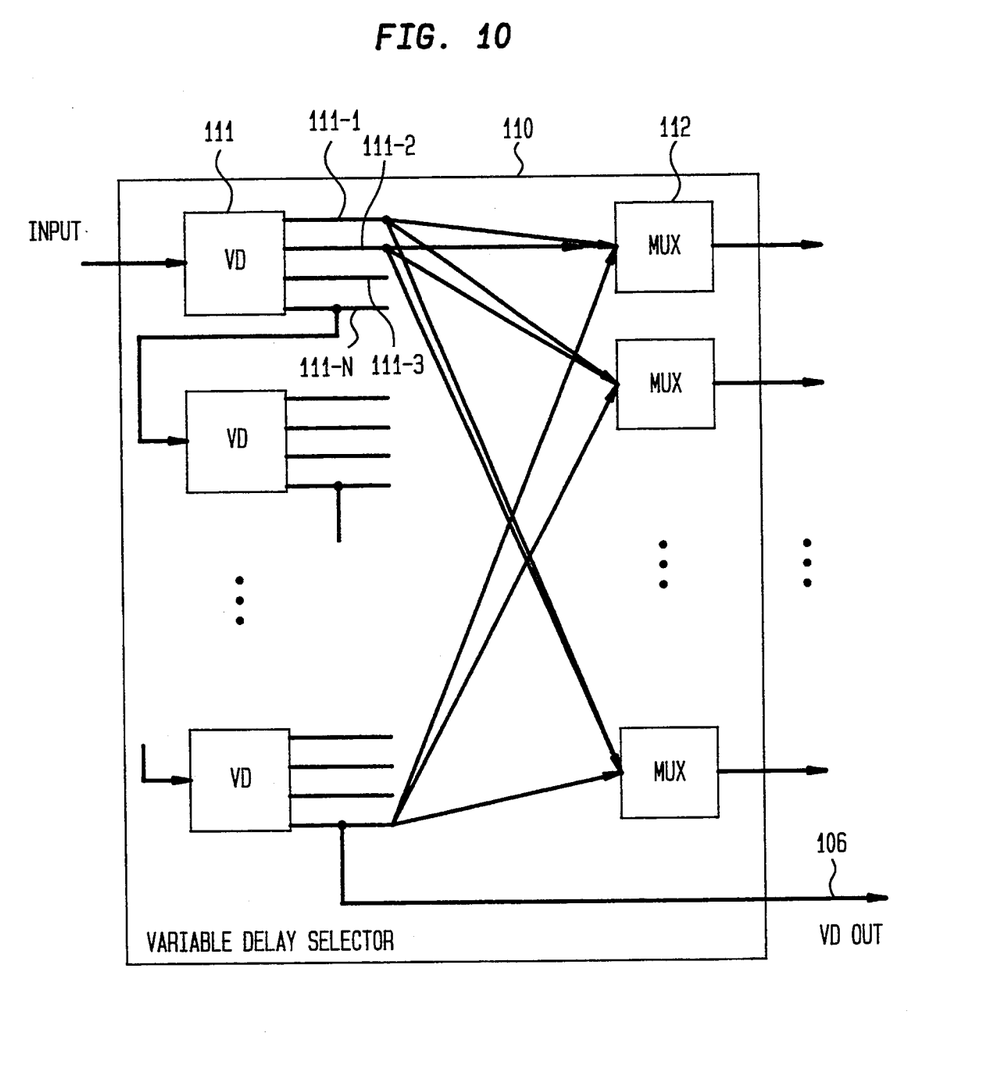
FIG. 10 depicts an alternative variable delay selector for use in the circuit depicted in FIG. 9.

Referring now to FIG. 10, an alternative variable delay selector 110, for use in the circuit 100 (FIG. 9) is shown. As depicted therein, each of the variable delay elements, e.g., the variable delay element 111, has m outputs 111-1, 111-2, 111-3, . . . , 111-m, where m is any integer ≧1. The delay period of each of the m outputs, e.g., the output 111-2, may be adjusted from a minimum of zero to the maximum number n of clock cycles for which the variable delay element 111 can delay a video signal. Each of these m outputs is also connected to an input of one of the multiplexers, e.g., the multiplexer 112. Thus, if there are I variable delay elements with m outputs each, each multiplexer has (a maximum of) I·m inputs. The operation of the variable delay selector 110 is otherwise the same as the variable delay selector 101 (FIG. 8).

In summary, a ghost canceller circuit is disclosed which may be used in either a FIR filter part, an IIR filter part, or both parts of a transversal filter. The inventive circuit includes I daisy chained variable delay elements, J transversal filter elements and J multiplexers interconnecting the variable delay elements to the transversal filter elements. The inventive circuit provides increased flexibility for filtering and can be easily expanded to support higher precision tap coefficients. Furthermore, the inventive ghost canceller provides a reasonably simple transversal filter at a reduced cost and which may be implemented relatively easily within an integrated circuit chip.

Finally, the aforementioned embodiments were intended to be merely illustrative. Numerous other embodiments may be devised by those having ordinary skill in the art without departing from the scope of the following claims.

I claim:

1. A ghost canceling circuit comprising:
   I daisy chained variable delay elements, where I is an integer ≧1, including a first variable delay element which receives an inputted video signal,
   J multiplexers, where J is an integer ≧1, each of said J multiplexers having at least one input connected to an output of each of said variable delays,
   J transversal filter elements, each transversal filter element connected to the output of a corresponding multiplexer, and
   an adder for adding together the signals outputted by each of said transversal filter elements.

2. The circuit of claim 1 wherein the number I of variable delay elements is chosen independently from the number J of transversal filter elements.

3. The circuit of claim 1 further comprising an output connected to the last of said daisy chained variable delay elements for connection to the video input of another ghost cancelling circuit.

4. The circuit of claim 1 wherein each of said variable delay elements comprises m outputs, where m is an integer ≧1, and wherein the delay period of the video signals outputted from each output may be independently adjusted from zero to the greatest delay period for each of said variable delay elements.

5. The circuit of claim 1 wherein said daisy chained variable daisy elements and said multiplexers are disposed within one integrated circuit chip.

6. The circuit of claim 1 further comprising an analog to digital converter, connected to the input of said first variable delay element, for converting said received video signal to digital form.

7. The circuit of claim 1 further comprising electronic processing means for comparing a received ghost cancelling reference signal comprised within said received video signal with an ideal ghost cancelling reference signal and, based on the discrepancy therebetween, determining and outputting tap coefficients to said transversal filter elements for filtering said video signal.

8. The circuit of claim 1 further comprising means for adjusting the delay of an $i^{th}$ of said variable delay elements, where i is an integer 1≦i≦I such that a video signal outputted by the variable delay element to at least one multiplexer is delayed an amount approximately equal to the period separating a ghost from a main signal within said inputted video signal.

9. The circuit of claim 1 further comprising tap gain control means for enabling at least one of said multiplexers to select the output of at least one of said variable delay elements.

10. The circuit of claim 1 wherein at least one transversal filter element comprises an input data path with a plurality of multiplexers and delay elements, each successive multiplexer having an input connected directly to the output of a preceding multiplexer and an input connected via one of said delay elements to said output of said preceding multiplexer.

11. A television receiver comprising:
a display device for displaying video images, and
a channel equalizer for receiving a video signal with one or more ghosts from a multi-path channel and for outputting said video signal with said one or more ghosts cancelled for display on said display device, said channel equalizer comprising:
an electronic processor for computing an array of tap coefficients for said one or more ghosts of said received video signal, and
a filter for receiving said tap coefficients, for cancelling each of said one or more ghosts by filtering said received video signal with a corresponding array of tap coefficients, said filter comprising:
I variable delay elements sequentially connected in tandem, where I is an integer $\geq 1$, a first of said variable delay elements capable of receiving said received video signal, each variable delay element capable of outputting said video signal delayed by a sum of delay periods of that variable delay element which are adjusted therein and delay periods adjusted in each preceding variable delay element,
J multiplexers, where J is an integer $\geq 1$, each of said multiplexers capable of selecting the delayed video signal outputted from any one of said I variable delay elements,
J transversal filter elements, each capable of receiving the delayed video signal selected by a corresponding one of said J multiplexers, and also receiving one of said arrays of tap coefficients, for filtering said selected delayed video signal with said array of tap coefficients, and
an adder circuit, for adding together the filtered video signal outputted from each of said transversal filter elements.

12. A process for cancelling a ghost from a received video signal comprising:
inputting a video signal to I variable delay elements sequentially connected in tandem, where I is an integer $\geq 1$,
adjusting a delay of a first i of said variable delay elements, where i is an integer $1 \leq i \leq I$, such that a video signal outputted by the $i^{th}$ variable delay element is delayed an amount approximately equal to the period separating said ghost from a main signal within said received video signal,
selecting as the output of a multiplexer, said delayed video signal outputted by said $i^{th}$ variable delay element, and
filtering said delayed video signal with tap coefficients, suitable determined for cancelling said ghost in a transversal filter element connected said multiplexer.

13. A process for overlapping P arrays of lower precision tap coefficients comprising:
adjusting a delay period of at least one daisy chained variable delay element to be approximately equal to the interval separating a ghost from a main video signal to be recovered,
selecting as the output of P multiplexers, the delayed video signal outputted by said at least one daisy chained variable delay element, where P is an integer $> 1$,
separately and simultaneously filtering each video signal outputted by said P multiplexers in one of P transversal filter elements connected to each of said P multiplexers, respectively, with a corresponding one of P lower precision arrays of tap coefficients, and
adding together the video signals outputted by said P transversal filter elements,
wherein the sum of said P lower precision arrays equals a predetermined higher precision array of tap coefficients suitably determined for cancelling said ghost.

* * * * *